(12) United States Patent
Shturm et al.

(10) Patent No.: US 10,264,401 B1
(45) Date of Patent: Apr. 16, 2019

(54) POWER MANAGEMENT FOR LOCATION SHARING

(71) Applicant: WhatsApp Inc., Menlo Park, CA (US)

(72) Inventors: Alexander Shturm, San Jose, CA (US); George Nachman, Sunnyvale, CA (US); Chun Wing Yuen, Foster City, CA (US); Zafir Khan, Redwood City, CA (US); Dmitri Stukalov, Menlo Park, CA (US); Sergey Petrov, Campbell, CA (US); Eugene Fooksman, Menlo Park, CA (US)

(73) Assignee: WhatsApp Inc., Menlo Park, CA (US)

(*) Notice: Subject to any disclaimer, the term of this patent is extended or adjusted under 35 U.S.C. 154(b) by 0 days.

(21) Appl. No.: 15/809,842

(22) Filed: Nov. 10, 2017

(51) Int. Cl.
*H04W 4/02* (2018.01)
*H04W 4/029* (2018.01)

(52) U.S. Cl.
CPC ......... *H04W 4/025* (2013.01); *H04W 4/026* (2013.01); *H04W 4/027* (2013.01); *H04W 4/029* (2018.02)

(58) Field of Classification Search
CPC ..... H04W 4/025; H04W 4/026; H04W 4/027; H04W 4/029
USPC ........................................................ 455/457
See application file for complete search history.

(56) References Cited

U.S. PATENT DOCUMENTS

| 8,429,236 | B2 | 4/2013 | Brown et al. | |
|---|---|---|---|---|
| 2015/0295769 | A1* | 10/2015 | Anderson | H04L 65/1069 370/254 |
| 2015/0350140 | A1* | 12/2015 | Garcia | H04L 51/20 715/753 |
| 2016/0269868 | A1* | 9/2016 | Su | H04W 4/029 |
| 2017/0123614 | A1* | 5/2017 | Perlegos | H04N 21/2187 |
| 2017/0353836 | A1* | 12/2017 | Gordon | H04W 4/023 |
| 2018/0197418 | A1* | 7/2018 | Chu | G06Q 10/02 |

* cited by examiner

*Primary Examiner* — Inder P Mehra
(74) *Attorney, Agent, or Firm* — Fenwick & West LLP

(57) ABSTRACT

A messaging server receives a sharing message from a sharer client indicating that the sharer client is offering to provide live location information. When the messaging server receives a subscription request from a receiver client indicating a request to receive live location information shared by the sharer client, the messaging server sends a location request to the sharer client. The location request requests live location information from the sharer client. The sharer client determines its location using a location module and sends live location information to the messaging server in response to the request. The server sends the live location information received from the sharer client to the receiver client. When no receiver clients send subscription requests, the sharer client does not send live location information, thereby preserving power by limiting use of the location module.

21 Claims, 4 Drawing Sheets

POWER MANAGEMENT FOR LOCATION SHARING

BACKGROUND

1. Field of the Invention

This invention pertains in general to electronic messaging and in particular to sharing locations among users of an electronic messaging system.

2. Description of the Related Art

Electronic messaging as a means of communication has become increasingly popular. Users of electronic messaging systems often desire to share their locations with others. Sharing locations can be beneficial in many situations. For example, people meeting at a crowded public venue can share their locations amongst themselves in order to find one another.

People typically share their location by sharing the location of a mobile telephone or other electronic device that they have on their person. A messaging application running on the device uses location-detection functionality built into the device to determine the current location and share this information with others.

The mobile device is usually battery-powered, and the acts of determining and sharing the location may consume a large amount of power. Therefore, a device that is sharing its location may consume its stored battery power at an undesirable rate. Since battery life is an important consideration for mobile device users, people may avoid sharing their locations in order to conserve power. The utility of the mobile device is therefore lessened.

SUMMARY

The above and other problems are addressed by a computing environment supporting power management for location sharing comprising a sharer client, a messaging server, a network, and one or more receiver clients. The sharer client sends a sharing message to the messaging server indicating that the sharer client is offering to provide live location information. The messaging server then communicates this sharing to the receiver clients. When the messaging server receives at least one subscription request from a receiver client indicating a request to receive live location information shared by the sharer client, the messaging server sends a location request to the sharer client. The location request requests live location information from the sharer client. The sharer client uses a location module to determine its geographic location and sends live location information to the messaging server in response to the location request. The messaging server distributes the live location information received from the sharer client to the one or more receiver clients. When no receiver clients send subscription requests, the sharer client does not determine nor send live location information. This technique preserves power at the sharer client because it does not need to use the location module to determine live location information unless a receiver is using that information.

The figures depict an embodiment of the invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
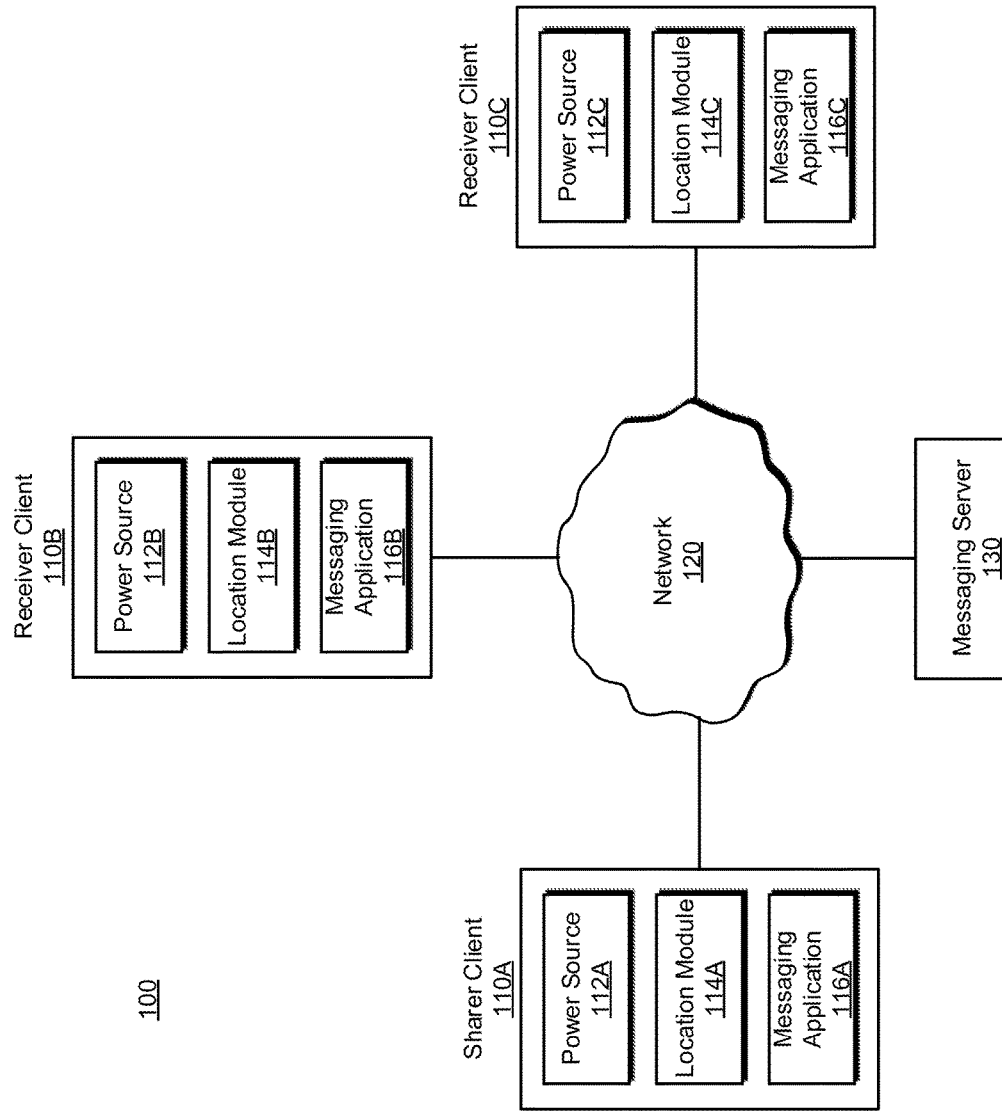
FIG. 1 is a high-level block diagram of a computing environment supporting power management for location sharing, according to one embodiment.

FIG. 1 is a high-level block diagram of a computing environment 100 supporting power management for location sharing, according to one embodiment. FIG. 1 illustrates three clients 110A, 110B, 110C and a messaging server 130 connected by a network 120. Only three clients 110 and one messaging server 130 are shown in FIG. 1 in order to simplify and clarify the description. Embodiments of the computing environment 100 can have many clients 110 and messaging servers 130 connected to the network 120. Likewise, the functions performed by the various entities of FIG. 1 may differ in different embodiments.

FIG. 1 uses like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral. For example, "110" in the text refers to reference numerals "110A," "110B," and/or "110C" in the figures.

A client 110 is an electronic device used by a user to perform functions such as communication with other clients, executing software applications for various purposes, and consuming electronic content such as content hosted by web servers on the network 120. For example, the client may be a smart phone, or a tablet or notebook computer. The client 110 includes a display on which the user may view content such as electronic messages and maps. In addition, the client 110 includes a user interface (UI), such as physical and/or on-screen buttons, which the user may interact with to perform various functions with the client.

The client 110 includes a power source 112, a location module 114, and a messaging application 116. Depending upon the embodiment, the location module 114 and/or messaging application 116 may be integrated into the operating system or other software executing on the client 110.

The power source 112 provides electric power allowing the client 110 to operate. The power source 112 may be rechargeable and provide limited or unlimited power depending upon the configuration of the client 110. For example, the power source 112 may be a rechargeable battery integrated into the client 110. When the power source 112 is actively being charged, the power source can concurrently and indefinitely provide power to the client 110. When the power source 112 is not being charged, the power source can provide a limited amount of power to the client 110. The client 110 depletes the power of the power source 112 at varying rates depending on which functions are performed by the client 110 and how often functions are performed. Some functions consume more power than others.

The location module 114 generations location information describing the geographic location of the client 110. The location module 114 makes the location information available to the messaging application 116 and other applications executing on the client. Given that the client 110 is often in close proximity to the user using the client, the client's location may be used as a proxy for the user's location and vice versa.

The location module 114 may be implemented in any of a variety of ways depending upon the embodiment. For example, the location module 114 may use location detection functionality provided by the Global Positioning System (GPS), cellular tower triangulation, Wi-Fi access point identification, or combinations of these techniques. Different types of location detection functionality may detect the location of the client 110 with different degrees of accuracy. In addition, some types of location detection functionality may be configured to detect the location with varying accuracy levels depending on what is requested. For example, the location module 114 may use GPS functionality to detect the location of the client 110 at varying and selectable levels of accuracy.

The location module 114 consumes power from the power source 112. Usage of the location module 114 may consume more power than usage of other modules within the client 110, such that frequent use of the location module 114 consumes a substantial amount of the limited power within the power source 112. The amount of power consumed by the location module 114 may vary depending upon the location detection functionality used to generate the location information. In addition, the amount of power consumed within a time interval may vary depending upon the location accuracy level. For example, the GPS receiver may consume more power to obtain a more accurate location than it uses to obtain a less accurate location.

The messaging application 116 runs on the client 110 and allows the user to exchange electronic messages with users of other clients via the network 120. The exchanged messages may include text, images, video, multimedia content, and location information. Depending upon the embodiment, the messaging application 116 may exchange messages by directly communicating with messaging applications of other clients (e.g., using peer-to-peer techniques) or by communicating the information through the messaging server 130.

A user of the messaging application 116 can exchange messages with one or more other users. The exchange of messages between a set of users is referred to herein as a message "context." The context is also sometimes referred to as a "thread." The messages within a particular context can be exchanged one-to-one, one-to-many, or many-to-many. Generally, users can only access messages within contexts in which they are participants. Users cannot access messages within contexts in which they are not participants.

The user may use the messaging application 116 to share a message indicating his or her current geographic location (referred to as the "live location") with other users in a message context. Such a user is referred to as a "sharer" and the client 110A used by the sharer is referred to as the "sharer client" as shown in FIG. 1. The messaging application 116 shares a live location by sending one or more "location messages" indicating the live location to the other users in the context. The user may share the live location for a specified duration, such as 15 minutes, 1 hour, or 4 hours, sending multiple location messages with updated locations. Sharing a live location activates the location module 114 on the client 110 to generate the locations for the messages, and therefore consumes more power from the power source 112 than if the location were not being shared. In one embodiment, the messaging application 116 turns off live location sharing by default, and the user must actively instruct the messaging application to share live location information in order to use the location-sharing functionality.

A user may also receive a message with a live location shared by another user in the context. Such a user is referred to as a "receiver" and the client 110 used by the receiver is referred to as the "receiver client." FIG. 1 illustrates two receiver clients 110B, 110C. A messaging application 116 that receives a location message from another messaging application can display the live location indicated by the location message on a map or otherwise generate a visual indication of the live location. A given client 110 can simultaneously act as a sharer and/or receiver in one or more contexts. For example, a client 110 can act as a sharer client in a first context and act as a receiver client in a second context.

The messaging server 130 interacts with the messaging applications 116 of the clients 110 via the network 120 to facilitate exchanges of messages between the clients 110. In one embodiment, the messaging server 130 detects contexts in which one or more clients 110 have activated live location sharing. The messaging server 130 mediates the live location sharing among the clients 110 in a context using a publication/subscription model to cause a sharer client 110A to use the location module 114 only when a receiver client 110B, 110C in the context is actively viewing the location. Said another way, the messaging server 130 causes the sharer client 110A to send location messages only when at least one other client is actively displaying or otherwise consuming the sharer client's location.

The messaging server 130 in combination with the messaging applications 116 of the clients 110 therefore interact to reduce power consumption in clients sharing live location information. Rather than activating the location module 114 for the entire duration of time that a client 110 is sharing its live location, the location module 114 is activated only when another client is actively consuming the shared live location information. The power supplied by the power sources 112 of the sharer clients is thus conserved, which allows users to use the clients 110 for longer periods of time between recharge. In addition, users may share live location information more freely due to the knowledge that this sharing will not unduly consume the power of the power source 112.

The network 120 enables communications among the clients 110 and the messaging server 130 and can comprise the Internet as well as mobile telephone networks. In one embodiment, the network 120 uses standard communications technologies and/or protocols. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. The messages exchanged by the clients 110 can also be encrypted. The entities can use custom and/or dedicated data communications technologies instead of, or in addition to, the ones described above.

Figure 2:
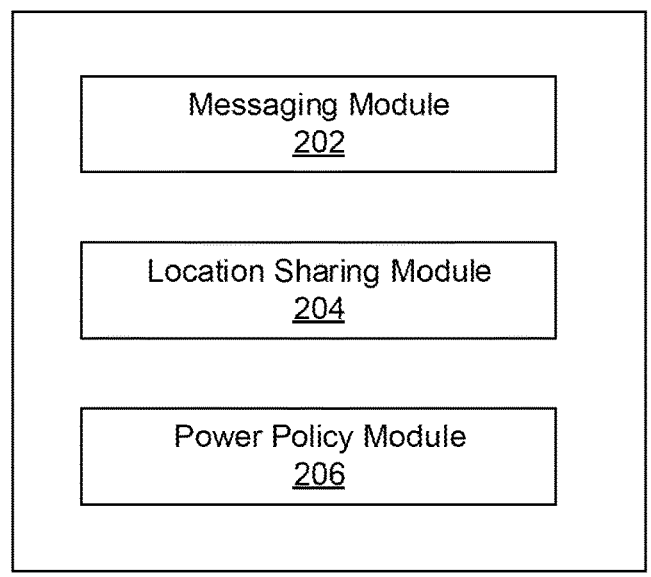
FIG. 2 is a high-level block diagram illustrating a detailed view of the messaging application of a client, according to one embodiment.

FIG. 2 is a high-level block diagram illustrating a detailed view of the messaging application 116 of a client 110, according to one embodiment. As shown in FIG. 2, the messaging application 116 includes a messaging module 202, location sharing module 204, and location policy module 206. Those of skill in the art will recognize that other embodiments of the messaging application 116 can have different and/or other modules than the ones described here, and that the functionalities can be distributed among the modules in a different manner.

The messaging module 202 exchanges messages with the messaging applications of other clients 110. As mentioned above, the messages may be exchanged either directly or via the messaging server 130. The messaging module 202 also provides one or more UIs allowing a user of the messaging application 116 to compose messages, view messages received from other users, and configure the messaging application.

With respect to live location sharing, the messaging module 202 allows the user to selectively share the user's live location information with other users. The user can share the location with other users in a particular context, and the user can also simultaneously share the location with multiple different contexts. As mentioned earlier, live location sharing is turned off by default in one embodiment. The user must therefore actively instruct the messaging module 202 to share the user's live location. In addition, the user specifies a duration of time for which the user's live location is shared. Live location sharing automatically stops after the time duration expires, at which point the user may again instruct the messaging module 202 to share the user's location. In one embodiment, the messaging module 202 provides a UI on the display of the client 110 allowing the user to select a message context and choose to share live location information with other users in the context for a specified duration.

In addition, the messaging module 202 allows the user to selectively view live location information shared by other users. An embodiment of the messaging module 202 provides a UI on the display of the client 110 allowing the user to choose whether to view live location information shared by other users. For example, the messaging module 202 may provide an icon or other indicator in association with a message context indicating that live location information is available from users in the context. The UI allows the user to select the indicator, or another UI control, to view the live location information. When the user selects to view the location information, the UI shows a map of a geographic area. An indicator on the map shows the live location of a sharing user on the map. For example, the indicator may be a pin icon or picture of the sharing user anchored at the live location of the sharing user. For each sharer, the map may also or instead display the name of the sharer, a timestamp of the last live location update for that sharer, remaining sharing duration, the accuracy of the live location, the bearing of the sharer, the speed of the sharer, and/or additional information. The indicator moves on the map as the sharer's geographic location changes. The map may show indicators for multiple sharers simultaneously, and the sharers may be in the same or different message contexts.

The location sharing module 204 acts in conjunction with the messaging module 202 to process live location information. The processing includes sharing live location information with other clients 110, and receiving live location information from other clients. The location sharing module 204 interacts with the messaging server 130 for both of these functions.

Specifically, the location sharing module 204 receives an instruction from the messaging module 202 when the user indicates to share live location information with a particular message context. Upon receiving the instruction, location sharing module 204 sends a sharing message to the messaging server 130 indicating that the sharer client 110A has begun sharing live location information. Note that the sharing message does not include live location information. Rather, the sharing message indicates that the sharer client 110A is offering to provide live location information to receiver clients 110B, 110C that subscribe to the information. The sharing message indicates the duration of the location sharing and the identities of the users to whom the location information is being offered. The identities may be specified by providing user identifiers (IDs) uniquely identifying the users sharing the context with which the location is being shared and/or providing a context ID uniquely identifying the context. The message may be sent by making an application programming interface (API) call to the messaging server 130, for example.

In addition, the location sharing module 204 receives and responds to location requests from the messaging server 130 requesting the sharer's live location information. The location sharing module 204 typically receives a location request when a receiver client 110B, 110C is actively consuming live location information from the sharer. For example, the location sharing module 204 may receive a location request when the user of a receiver client (e.g., client 110B) activates the map showing live location information.

A location request includes the IDs of the one or more receivers and/or contexts that are seeking the user's live location information and a live location duration indicating an amount of time for the sharer client 110A to send the live location information. An embodiment of the location sharing module 204 performs a security check by verifying that the IDs included in the location request match the IDs with which the user is currently sharing live location information. If the security check fails because one or more of the IDs do not match, the location sharing module 204 may ignore the location request and/or perform other actions such as generating a report indicating that a security violation occurred.

If the security check passes because the one or more IDs match the IDs with which the user is currently sharing live location information, then the location sharing module 204 provides the live location information to the messaging server 130 for the live location duration. In response, the location sharing module 204 activates the location module 114 to obtain the current location of the client sharer 110A. The location sharing module 204 forms a location message containing the current location, and sends the location message to the messaging server 130. The location sharing module 204 sends the messages on a periodic or other basis until the live location duration expires. This way, the location sharing module 204 activates the location module 114 only when responding to a location request. The location module 114 can remain inactive at other times, thus conserving power.

In one embodiment, the location sharing module 204 sends a pending subscription request message to the messaging server 130 when a sharer client 110A regains network connectivity after an outage. For example, the sharer client 110A may send the request after being turned on or switched from airplane mode back to normal mode, and/or when exiting a region without wireless network coverage. If there are any pending location requests for the client's live location, the messaging server 130 will send the location requests in response to the pending subscription request. In this way the sharer can immediately start sharing live location information upon regaining network connectivity.

In addition to sharing live location information, the location sharing module 204 receives live location information shared by other clients 110. The location sharing module 204 interacts with the messaging server 130 to request and receive this information. In one embodiment, the location sharing module 204 receives a location shared message from the messaging server 130 indicating that another user is sharing live location information. The location shared message includes the ID of the sharer and the duration for which the information is being shared. In one embodiment, the location shared message also includes a subscription duration indicating an amount of time a subscription for live location information from the sharer will last. The subscription duration is typically a fairly brief amount of time, such as 30 seconds. Upon receipt of the location shared message, the location sharing module 204 notifies the messaging module 202 of the sharing. The messaging module 202 may then, in turn, update the UI on the client 110 to indicate that another user is sharing live location information and, optionally, the duration of the sharing.

When a user acting as a receiver uses the live location information shared by another user acting as a sharer, the location sharing module 204 of the receiver client (e.g., 110B) sends a subscription request to the messaging server 130. For example, the location sharing module 204 may send the subscription request when the receiver uses the UI to view the map showing the sharer's live location. The subscription request includes the ID of the sharer and indicates that the receiver is using (e.g., viewing) the live location information of the sharer. The location sharing module 204 receives live location sharing information from the sharer, via the messaging server 130, for the duration of the subscription. After the subscription expires (i.e., the subscription duration passes), the location sharing module 204 of the receiver client 110B can send one or more additional subscription requests while the receiver is still using the live location information shared by the sharer.

In one embodiment, the location sharing module 204 sends the messaging server 130 an explicit "end subscription" message to end the subscription if the user of the client 110 stops using the live location information before the subscription expires. In addition, since the location shared message received by the location sharing module 204 indicates the sharing duration for which the live location information is being shared, the location sharing module 204 can automatically stop sending subscription requests once the sharing duration expires.

The power policy module 206 controls the behavior of the location sharing module 204 according to a power policy. The power policy specifies restrictions on how and when the location sharing module 204 can use the location module 114 of the client 110. These restrictions are independent of the policies and behaviors of the messaging 202 and location sharing 204 modules. The power policy implemented by the power policy module 206 thus acts as an independent control on power consumption by the live location sharing features of the messaging application 116. In one embodiment, the power policy module 206 is inactive when the client 110 is charging or otherwise connected to an external power source.

In one embodiment, the power policy module 206 places restrictions on the accuracy of the location module 204 depending on the amount of live location information the sharer client 110A has provided in a previous time interval. The power policy module 206 intercepts requests by the location sharing module 204 to access the location module 114 and may change the requests based on the policy. In one embodiment, the power policy module 206 tracks the cumulative time that the location sharing module 204 has used the location module 204 within a prior time interval. That is, it tracks the time that the location sharing module 204 actively used the location module 204 to determine the location of the client 110 during the interval. In one embodiment, the power policy module 206 tracks the usage time over a rolling period, such as over a rolling 24-hour period (i.e., over the prior 24 hours). If the usage time exceeds a threshold amount of time, the power policy lowers the accuracy level of the location module 204 in order to reduce power consumption on the client 110. The power policy module 206 may exclude from the tracked time usage that occurs when the client 110 is being charged or otherwise connected to an external power source.

In one specific embodiment, the power policy module 206 applies the power policy each time the location sharing module 204 seeks to access the location module 114. If the location sharing module 204 has used the location module 114 for under a first threshold amount of time (e.g., 2 hours of the previous 24 hours), the power policy allows usage of the location module 114 at the highest level of accuracy. If the location sharing module 204 has used the location module 114 for under a second threshold amount of time greater than the first threshold (e.g., 2-5 hours of the previous 24 hours), the power policy allows usage of the location module 114 at a medium level of accuracy. If the location sharing module 204 has used the location module 114 for under a third threshold amount of time greater than the second threshold (e.g., more than 5 hours of the previous 24 hours), the power policy allows usage of the location module 114 at a low level of accuracy.

Other embodiments of the power policy module 204 use different power policies. The power policy may be based on the level of charge in the power source 112 in addition to, or instead of, usage time. For example, the power policy can use the thresholds described above based on the amount of power remaining in the power source 112 instead of the amount of cumulative time (e.g., more power remaining in the power source corresponds with greater location accuracy). In one embodiment, the power policy module 204 allows usage of the location module 114 at only a low level of accuracy if the remaining power is less than 50% of maximum capacity.

Figure 3:
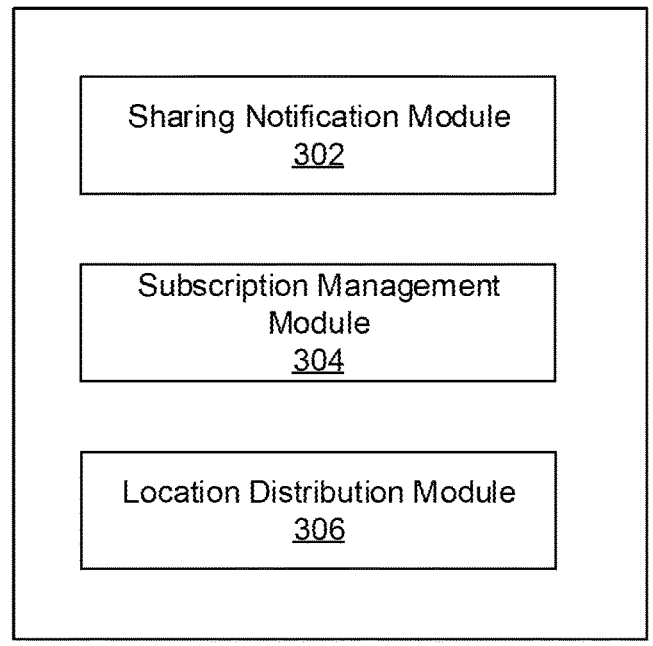
FIG. 3 is a high-level block diagram illustrating a more detailed view of the messaging server, according to one embodiment.

FIG. 3 is a high-level block diagram illustrating a more detailed view of the messaging server 130, according to one embodiment. As shown in FIG. 3, the messaging server 130 includes a sharing notification module 302, subscription management module 304, and location distribution module 306. Those of skill in the art will recognize that other embodiments of the messaging server 130 can have different and/or other modules than the ones described here, and that the functionalities can be distributed among the modules in a different manner.

The sharing notification module 302 processes sharing messages received from sharer clients 110A and sends corresponding location shared messages to receiver clients 110B, 110C. Recall that a sharing message indicates that a client 110A has begun sharing live location information and indicates the duration of the location sharing and the identities of the receiver clients 110B, 110C. Upon receipt of a sharing message, the sharing notification module 302 parses the message to extract identifiers of the sharer and the receivers, and the sharing duration. The receivers may be identified by extracting a context ID from the sharing message and using context information stored at the messaging server 130 to identify the receivers. The receivers may also be identified by extracting IDs of the receivers from the sharing message.

Upon identifying the receivers, the sharing notification module 302 sends a location shared message to each receiver. Recall that a location shared message includes the ID of the sharer and the sharing duration for which the live location information is being shared. The location shared message also includes the subscription duration indicating for how long subscriptions for live location information for the particular sharer will last.

The subscription management module 304 manages subscriptions by receivers for live location information from sharers. The subscription management module 304 receives subscription requests from the receivers. Upon receiving a request, the subscription management module 304 parses the request to extract the ID of the sharer and the ID of the receiver that requested the subscription. The subscription management module 304 uses information stored at the messaging server 130 to determine the subscription duration associated with the identified sharer, and creates a subscription for the receiver for the duration. Multiple receivers can subscribe to live location information from a given sharer. The subscriptions may have started at different times, and thus have overlapping but not co-incident durations. The subscription management module 304 terminates any pending subscriptions once the sharing duration expires.

In one embodiment, the sharing notification module 302 maintains subscription counters for the sharers that count how many receivers are subscribing to live location information from the sharers at a given point in time. A subscription counter is associated with a sharer, and the value of the counter indicates the number of receivers subscribed to live location information from that sharer at a given moment in time. The value of the counter increments as new subscriptions are received, and decrements as subscriptions expire. The counter may include the ID of the sharer with whom the counter is associated, and the IDs of the receivers who have subscriptions included in the count. If the value of the counter is zero, then no receivers are subscribing to live location information from the associated sharer. The sharing notification module 302 deletes the counter associated with a particular sharer once that sharer's sharing duration expires, thereby ending live location sharing for that sharer.

The location distribution module 306 distributes live location information from sharers to receivers. The location distribution module 306 uses the counters and other subscription information maintained by the subscription management module 304 to determine from which sharers to obtain live location information and to which receivers to distribute the information. The location distribution module 306 reads the values of the sharer counters. For the counters having non-zero values, the location distribution module 306 reads the associated IDs of the sharers and respective receivers. The location distribution module 306 then obtains the live location information from the identified sharers and sends the information to the respective receivers. In this way, the location distribution module 306 consolidates multiple subscriptions into one location request and sends the live location information to only the subscribing receivers. This consolidation reduces power consumption at the sharer by reducing the frequency that it accesses the location module 114.

In one embodiment, the location distribution module 306 may receive a pending subscription request message from a sharer. As mentioned earlier, the sharer client 110A may send such a request when the client regains network connectivity after an outage. Upon receiving the pending subscription request message, the location distribution module 306 reads the value of the counter associated with the sharer. If the counter has a non-zero value, the location distribution module 306 immediately sends a location request to the sharer client 110A.

Figure 4:
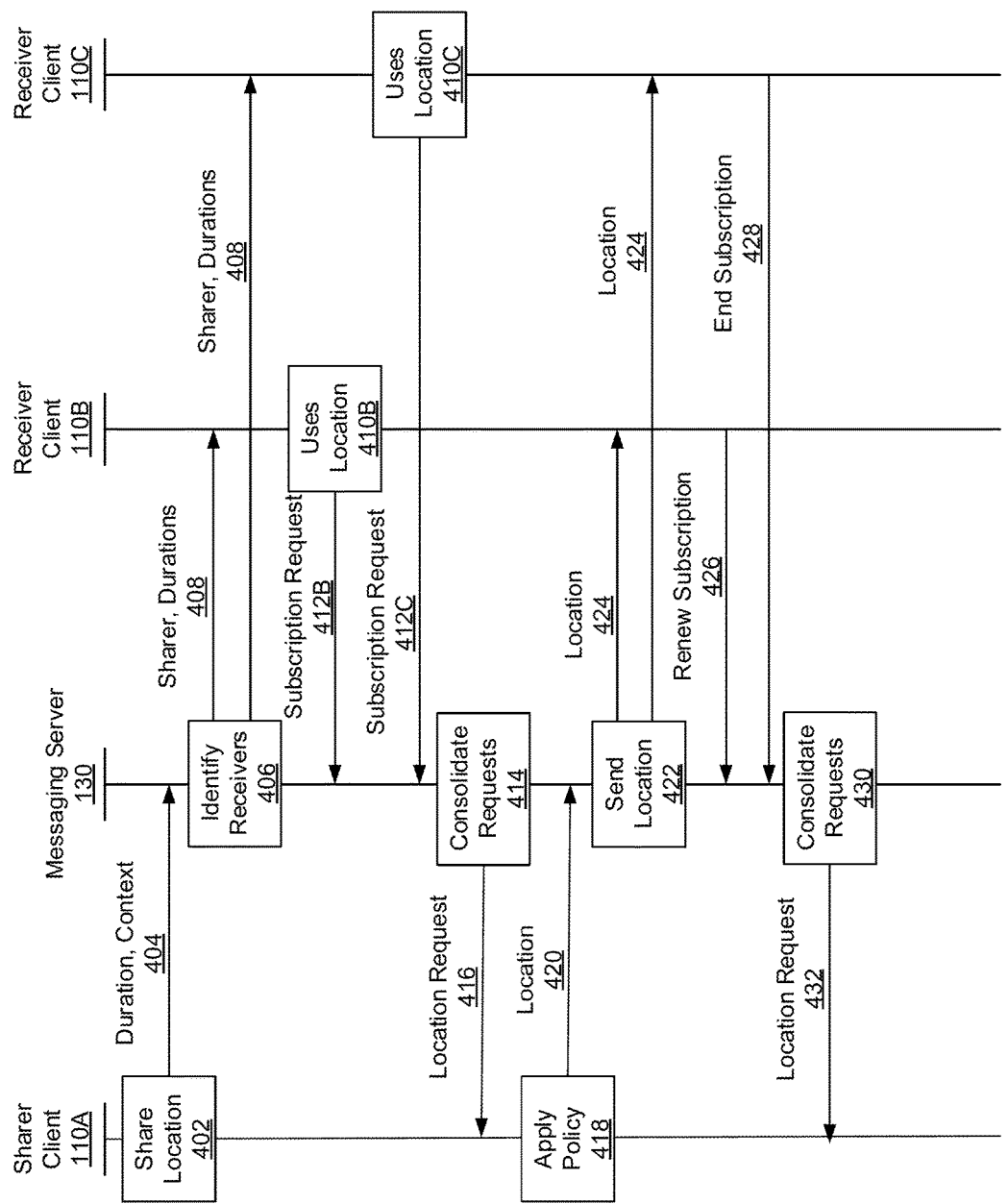
FIG. 4 is a flow diagram illustrating interactions among the entities of FIG. 1 to support power management for location sharing, according to one embodiment.

FIG. 4 is a flow diagram illustrating an example of interactions among the entities of FIG. 1 to support power management for location sharing, according to one embodiment. The top of FIG. 4 illustrates the sharer 110A and receiver 110B, 110C clients, and the messaging server 130. An associated vertical line descends from each entity and represents the forward flow of time. Boxes on the vertical lines represent actions performed by the associated entity. Horizontal lines represent interactions between the two entities associated with the vertical lines at which the horizontal lines terminate. The actions and interactions illustrated in FIG. 4 represent one embodiment. Other embodiments can have different actions and/or interactions, and the actions and/or interactions may occur in different orders. Additionally, in other embodiments, some actions may be performed in different entities, and the interactions may involve other entities.

The example of FIG. 4 begins with the user of a client 110A initiating 402 live location sharing. For example, the user of the client 110A may select a UI option indicating to share live location information with other users participating in a particular context for a particular duration of time. The sharer client 110A sends 404 a sharing message to the messaging server 130. The sharing message includes the ID of the sharer client 110A (which also serves as the ID of the sharer), the ID of the context in which to share the live location (which also identifies the receivers and the receiver clients 110B, 110C) and the duration of the sharing. The messaging server 130 receives the sharing message and uses the information contained therein to identify 406 the receivers, and also to identify the sharer and duration. The messaging server 130 proceeds to send 408 location shared messages to the receiver clients 110B, 110C. The location shared message indicates the identity of the sharer, the duration of the sharing, and a subscription duration indicating an amount of time a subscription for live location information from the sharer will last.

The example continues with the users (receivers) of receiver clients 110B and 110C using 410 the live location information from the sharer. For example, the receivers could use a UI provided by the receiver clients 110B or 110C to open a map showing the current location of the sharer 110A. In response to the receivers using the live location information, the receiver clients 110B, 110C send 412 subscription requests to the messaging server 130. A subscription request establishes a subscription for a receiver client 110B, 110C for live location information from an identified sharer for the subscription duration.

The messaging server 130 receives any subscription requests sent by the receiver clients 110B, 110C. In one embodiment, the messaging server 130 maintains a subscription counter associated with the sharer, and updates the counter as subscription requests are received and subscriptions expire. The messaging server 130 checks the value of the counter, for example on a periodic basis. If the counter value is greater than zero, the messaging server 130 sends 416 a location request to the sharer client 110A. Using the counter in this way serves to consolidate 414 location requests because it may result in sending 416 one location request on behalf of multiple subscribing receivers.

The sharer client 110A receives the location request from the messaging server 130. The location request includes the IDs of the receivers and/or receiver context that are subscribing to the live location information. The sharer client 110A performs a security check to verify that the receivers are those with whom the sharer is currently sharing live location information. In addition, the sharer client 110A applies 418 a power policy specifying restrictions on how and when the receiver client 110A can use its location module 114A. Assuming the security check passes and the power policy permits the live location sharing, the sharer client sends 420 location messages to the messaging server 130 in response to the location request for a live location duration. The location messages describe the current geographic location of the sharer client 110A.

The messaging server 130 receives the location messages from the sharer client 110A and sends 422 these messages 424 to the subscribing receiver clients 110B, 110C. The receiver clients 110B, 110C use the location messages to show the live location of the sharer on a map and/or for other purposes.

Assume at this point that the subscription duration expires while the receiver using receiver client 110B is still viewing the live location of the sharer on the map. Therefore, receiver client 110B sends 426 a new subscription request to the messaging server 130. This new subscription request serves to renew receiver client 110B's subscription to the sharer's live location information. In contrast, assume that the receiver using receiver client 110B stops viewing the live location of the sharer on the map, such as by closing the UI showing the map. In the example of FIG. 4, receiver client 110C sends 428 an end subscription message to the messaging server 130 that explicitly terminates receiver client 110C's subscription to the sharer's live location information. In some embodiments the receiver client 110C does not send the end subscription message, instead allowing the client's subscription to terminate automatically after the subscription duration expires.

Continuing the example, the messaging server 130 receives the renewing subscription request from receiver client 110B and either receives the end subscription message or automatically ends the subscription for receiver client 110C. The messaging server 130 consolidates 430 location requests by updating the subscription counter to account for the current subscriptions, which in this example means it decrements the counter to account for receiver client 110C. Since the counter value is non-zero due to receiver client 110B renewing its subscription, the messaging server 130 sends a new location request 432 to the sharer client 110A. While not shown in FIG. 4, the sharer client 110A continues to provide live location information while at least one receiver client is subscribed to the information and subject to the sharing duration and battery policy.

Figure 5:
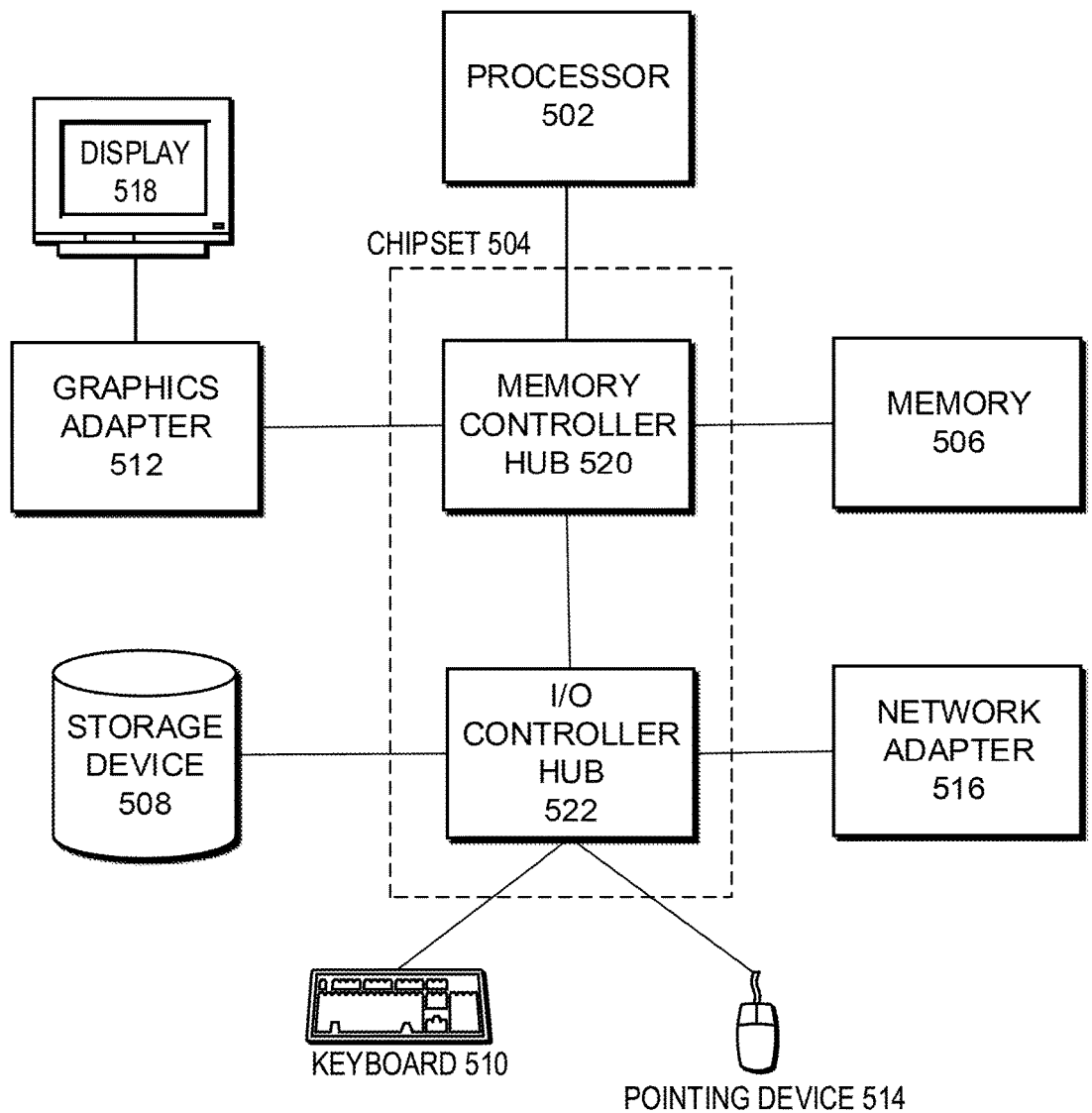
FIG. 5 is a high-level block diagram of a computer for acting as the client or server, according to one embodiment.

The entities shown in FIG. 1 are implemented using one or more computers. FIG. 5 is a high-level block diagram of a computer 500 for acting as a client 110 or a messaging server 130 in one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to the network 120.

As is known in the art, a computer 500 can have different and/or other components than those shown in FIG. 5. In addition, the computer 500 can lack certain illustrated components. For example, the computer acting as the messaging server 130 can be formed of multiple blade servers linked together into one or more distributed systems and lack components such as keyboards and displays. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:
1. A method comprising:
  receiving a sharing message from a sharer client, the sharing message indicating that the sharer client is offering to provide live location information;
  determining, from the sharing message, identities of one or more receiver clients to whom the live location information is being offered;
  sending a location shared message to each of the one or more receiver clients to whom the live location information is being offered, the location shared message identifying the sharer client that is offering to provide live location information, wherein the location shared message specifies a subscription duration indicating an amount of time a subscription for live location information from the sharer client will last;
  receiving a subscription request from a receiver client indicating a request by the receiver client to receive live location information shared by the sharer client;
  establishing a subscription to live location information from the sharer client in response to receiving the subscription request, the subscription expiring after the subscription duration;
  sending a location request to the sharer client in response to receiving the subscription request, the location request requesting live location information from the sharer client;

receiving, from the sharer client in response to the sharer client receiving the location request, live location information indicating a current geographic location of the sharer client; and
sending the live location information received from the sharer client to the receiver client for the duration of the subscription.

2. The method of claim 1, further comprising:
receiving a plurality of subscription requests indicating requests by a plurality of receiver clients to receive live location information from the sharer client;
wherein the location request is sent to the sharer client in response to receiving the plurality of subscription requests and the live location information received from the sharer client is sent to the plurality of receiver clients.

3. The method of claim 1, wherein the location request includes a live location duration indicating an amount of time that the sharer client should send the live location information, wherein receiving live location information comprises:
receiving a plurality of location messages, each location message describing a current location of the sharer client at a different point in time within the live location duration.

4. A non-transitory computer-readable storage medium storing computer program instructions executable by a processor to perform operations comprising:
receiving a sharing message from a sharer client, the sharing message indicating that the sharer client is offering to provide live location information;
determining, from the sharing message, identities of one or more receiver clients to whom the live location information is being offered;
sending a location shared message to each of the one or more receiver clients to whom the live location information is being offered, the location shared message identifying the sharer client that is offering to provide live location information, wherein the location shared message specifies a subscription duration indicating an amount of time a subscription for live location information from the sharer client will last;
receiving a subscription request from a receiver client indicating a request by the receiver client to receive live location information shared by the sharer client;
establishing a subscription to live location information from the sharer client in response to receiving the subscription request, the subscription expiring after the subscription duration;
sending a location request to the sharer client in response to receiving the subscription request, the location request requesting live location information from the sharer client;
receiving, from the sharer client in response to the sharer client receiving the location request, live location information indicating a current geographic location of the sharer client; and
sending the live location information received from the sharer client to the receiver client for the duration of the subscription.

5. The non-transitory computer-readable storage medium of claim 4, the operations further comprising:
receiving a plurality of subscription requests indicating requests by a plurality of receiver clients to receive live location information from the sharer client;
wherein the location request is sent to the sharer client in response to receiving the plurality of subscription requests and the live location information received from the sharer client is sent to the plurality of receiver clients.

6. The non-transitory computer-readable storage medium of claim 4, wherein the location request includes a live location duration indicating an amount of time that the sharer client should send the live location information, and wherein receiving live location information comprises:
receiving a plurality of location messages, each location message describing a current location of the sharer client at a different point in time within the live location duration.

7. A system comprising:
a processor for executing computer program instructions; and
a non-transitory computer-readable storage medium storing computer program instructions executable by the processor to perform operations comprising:
receiving a sharing message from a sharer client, the sharing message indicating that the sharer client is offering to provide live location information;
determining, from the sharing message, identities of one or more receiver clients to whom the live location information is being offered;
sending a location shared message to each of the one or more receiver clients to whom the live location information is being offered, the location shared message identifying the sharer client that is offering to provide live location information, wherein the location shared message specifies a subscription duration indicating an amount of time a subscription for live location information from the sharer client will last;
receiving a subscription request from a receiver client indicating a request by the receiver client to receive live location information shared by the sharer client;
establishing a subscription to live location information from the sharer client in response to receiving the subscription request, the subscription expiring after the subscription duration;
sending a location request to the sharer client in response to receiving the subscription request, the location request requesting live location information from the sharer client;
receiving, from the sharer client in response to the sharer client receiving the location request, live location information indicating a current geographic location of the sharer client; and
sending the live location information received from the sharer client to the receiver client for the duration of the subscription.

8. The system of claim 7, the operations further comprising:
receiving a plurality of subscription requests indicating requests by a plurality of receiver clients to receive live location information from the sharer client;
wherein the location request is sent to the sharer client in response to receiving the plurality of subscription requests and the live location information received from the sharer client is sent to the plurality of receiver clients.

9. The system of claim 7, wherein the location request includes a live location duration indicating an amount of time that the sharer client should send the live location information, wherein receiving live location information comprises:

receiving a plurality of location messages, each location message describing a current location of the sharer client at a different point in time within the live location duration.

10. A method comprising:
receiving a sharing message from a sharer client, the sharing message indicating that the sharer client is offering to provide live location information;
receiving a subscription request from a receiver client indicating a request by the receiver client to receive live location information shared by the sharer client;
sending a location request to the sharer client in response to receiving the subscription request, the location request requesting live location information from the sharer client;
receiving, from the sharer client in response to the sharer client receiving the location request, live location information indicating a current geographic location of the sharer client, wherein an accuracy of the live location information received from the sharer client is determined responsive at least in part to a power policy implemented by the sharer client, the power policy placing restrictions on the accuracy of the live location information responsive to an amount of live location information the sharer client has provided during a time interval; and
sending the live location information received from the sharer client to the receiver client.

11. The method of claim 10, further comprising:
receiving a plurality of subscription requests indicating requests by a plurality of receiver clients to receive live location information from the sharer client;
wherein the location request is sent to the sharer client in response to receiving the plurality of subscription requests and the live location information received from the sharer client is sent to the plurality of receiver clients.

12. The method of claim 10, wherein the location request includes a live location duration indicating an amount of time that the sharer client should send the live location information, wherein receiving live location information comprises:
receiving a plurality of location messages, each location message describing a current location of the sharer client at a different point in time within the live location duration.

13. The method of claim 10, wherein the power policy decreases the accuracy of the live location information responsive to increasing live location information sharing during the time interval.

14. A non-transitory computer-readable storage medium storing computer program instructions executable by a processor to perform operations comprising:
receiving a sharing message from a sharer client, the sharing message indicating that the sharer client is offering to provide live location information;
receiving a subscription request from a receiver client indicating a request by the receiver client to receive live location information shared by the sharer client;
sending a location request to the sharer client in response to receiving the subscription request, the location request requesting live location information from the sharer client;
receiving, from the sharer client in response to the sharer client receiving the location request, live location information indicating a current geographic location of the sharer client, wherein an accuracy of the live location information received from the sharer client is determined responsive at least in part to a power policy implemented by the sharer client, the power policy placing restrictions on the accuracy of the live location information responsive to an amount of live location information the sharer client has provided during a time interval; and
sending the live location information received from the sharer client to the receiver client.

15. The non-transitory computer-readable storage medium of claim 14, the operations further comprising:
receiving a plurality of subscription requests indicating requests by a plurality of receiver clients to receive live location information from the sharer client;
wherein the location request is sent to the sharer client in response to receiving the plurality of subscription requests and the live location information received from the sharer client is sent to the plurality of receiver clients.

16. The non-transitory computer-readable storage medium of claim 14, wherein the location request includes a live location duration indicating an amount of time that the sharer client should send the live location information, and wherein receiving live location information comprises:
receiving a plurality of location messages, each location message describing a current location of the sharer client at a different point in time within the live location duration.

17. The non-transitory computer-readable storage medium of claim 14, wherein the power policy decreases the accuracy of the live location information responsive to increasing live location information sharing during the time interval.

18. A system comprising:
a processor for executing computer program instructions; and
a non-transitory computer-readable storage medium storing computer program instructions executable by the processor to perform operations comprising:
receiving a sharing message from a sharer client, the sharing message indicating that the sharer client is offering to provide live location information;
receiving a subscription request from a receiver client indicating a request by the receiver client to receive live location information shared by the sharer client;
sending a location request to the sharer client in response to receiving the subscription request, the location request requesting live location information from the sharer client;
receiving, from the sharer client in response to the sharer client receiving the location request, live location information indicating a current geographic location of the sharer client, wherein an accuracy of the live location information received from the sharer client is determined responsive at least in part to a power policy implemented by the sharer client, the power policy placing restrictions on the accuracy of the live location information responsive to an amount of live location information the sharer client has provided during a time interval; and
sending the live location information received from the sharer client to the receiver client.

19. The system of claim 18, the operations further comprising:
receiving a plurality of subscription requests indicating requests by a plurality of receiver clients to receive live location information from the sharer client;

wherein the location request is sent to the sharer client in response to receiving the plurality of subscription requests and the live location information received from the sharer client is sent to the plurality of receiver clients.

20. The system of claim 18, wherein the location request includes a live location duration indicating an amount of time that the sharer client should send the live location information, wherein receiving live location information comprises:

receiving a plurality of location messages, each location message describing a current location of the sharer client at a different point in time within the live location duration.

21. The system of claim 18, wherein the power policy decreases the accuracy of the live location information responsive to increasing live location information sharing during the time interval.

\* \* \* \* \*